(12) United States Patent
Asao et al.

(10) Patent No.: US 6,462,440 B1
(45) Date of Patent: Oct. 8, 2002

(54) VEHICLE ALTERNATOR

(75) Inventors: Yoshihito Asao, Tokyo (JP); Yoshihiro Shinosaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 486 days.

(21) Appl. No.: 08/980,376

(22) Filed: Nov. 28, 1997

(30) Foreign Application Priority Data

Jul. 8, 1997 (JP) ............................................. 9-182670

(51) Int. Cl.[7] ................................................. H02K 5/24
(52) U.S. Cl. ......................................................... 310/51
(58) Field of Search ............................. 310/51, 62, 63, 310/263

(56) References Cited

U.S. PATENT DOCUMENTS 4,614,889 A * 9/1986 Ikegami et al. ............. 310/263
5,637,938 A * 6/1997 Vukorpa et al. ............... 310/51
5,693,992 A * 12/1997 Kurusu et al. ................. 310/63
5,757,102 A * 5/1998 Adachi et al. ............... 310/263

FOREIGN PATENT DOCUMENTS

| JP | 4-325853 | 11/1992 |
| JP | 4-351452 | 12/1992 |

* cited by examiner

Primary Examiner—Nestor Ramirez
Assistant Examiner—Peter Medley
(74) Attorney, Agent, or Firm—Sughrue Mion, PLLC (57) ABSTRACT

In a vehicle alternator, a bobbin around which a coil is wound is mounted in a Lundell-type poles, an auxiliary oscillating body is mounted to the poles so as to constitute a vibration system having a two-degree of freedom which is composed of the poles and the auxiliary oscillating body and the auxiliary oscillating body has a natural frequency approximately equal to that of the poles.

5 Claims, 8 Drawing Sheets

VEHICLE ALTERNATOR

BACKGROUND OF THE INVENTION

1. Field of the Invention

The present invention relates to the reduction of electromagnetic noise generated by the magnetic vibration of the claw-shaped magnetic pole portion of a vehicle alternator having a Lundell-type rotor.

2. Description of the Related Art

Figure 10:
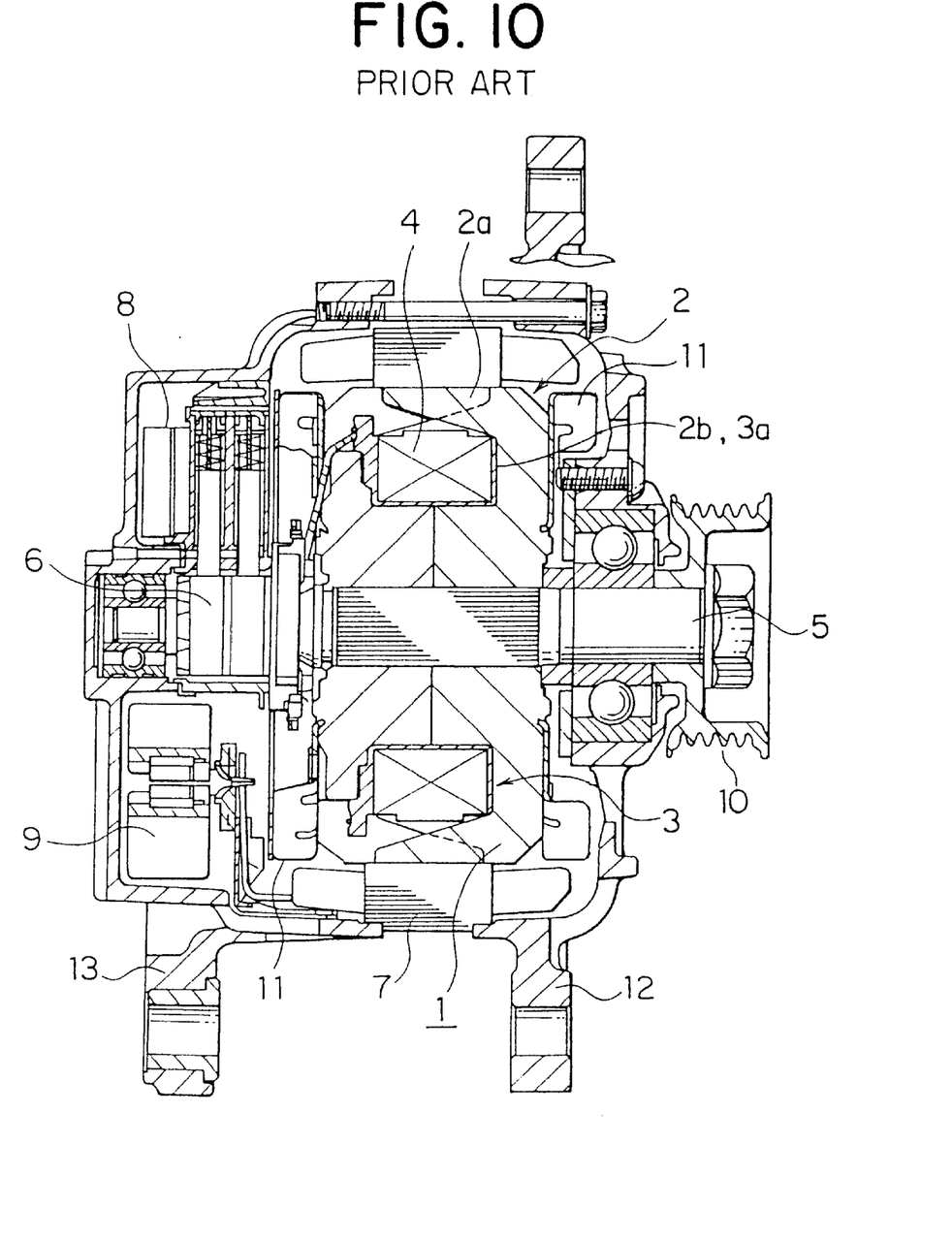
FIG. 10 is a sectional view showing a conventional vehicle alternator.
Figure 11:
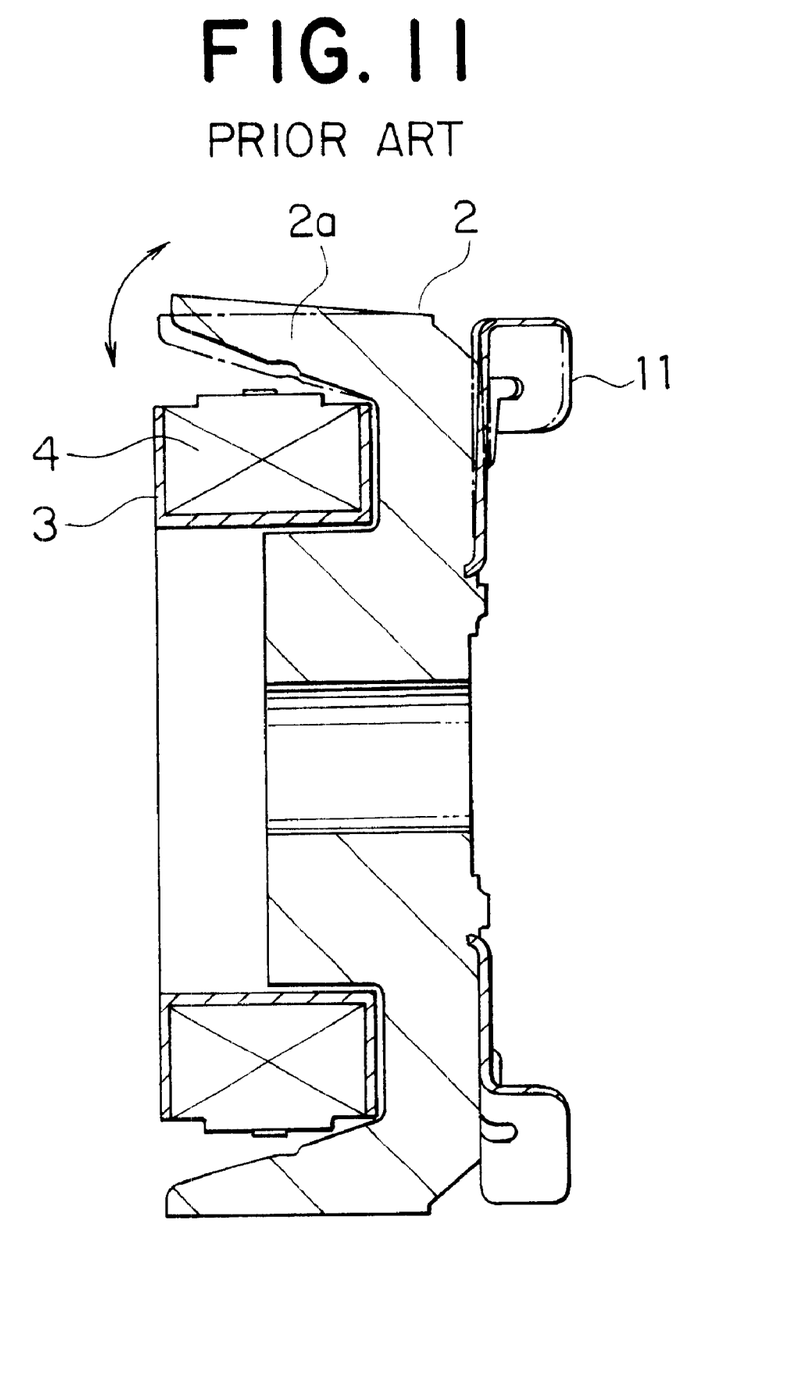
FIG. 11 is an enlarged sectional view showing the vicinity of the poles and the bobbin of the rotor of the conventional vehicle alternator.

FIG. 10 is a view showing the arrangement of a conventional vehicle alternator and FIG. 11 is an enlarged sectional view showing the vicinity of the poles and the bobbin of a rotor.

In the respective drawings, a rotor 1 is composed of a pair of claw-shaped poles 2 each having a plurality of claws 2a formed thereto, a bobbin 3 around which a coil 4 is wound, a rotary shaft 5 and a slip ring 6. The pair of poles 2 are disposed in confrontation with each other so that the claws 2a are meshed with other and the rotary shaft 5 is fixed by being press fitted into the axial center position of the claws 2a. The inner peripheries 2b of the base portions of the claws 2a are abutted against the outer periphery 3a of the bobbin 3 which is fixed between the pair of poles 2 by the press fitting force of the rotary shaft 5. A stator 7 is disposed to the outer peripheries of the poles 2 with a slight interval defined therebetween. A voltage controller is mounted to a brush holder 8. A pulley 10 is mounted to the rotary shaft 5 integrally therewith and fans 11 are mounted to the end surfaces of the poles 2 integrally therewith. A front bracket 12 and a rear bracket 13 are disposed to surround the rotor 1 while journaling the rotary shaft 5.

Next, operation of the conventional vehicle alternator will be described.

A current is supplied to the coil 4 through the brush holder 8 and the slip ring 6 and at the same time the pulley 10 is driven in rotation by a belt to thereby permit the stator 7 to generate an alternating current. The alternating current is converted into a direct current by a rectifier 9. While the vehicle alternator is in operation, a magnetic attracting force is imposed on the poles 2 by the magnetic flux in the interval between the poles 2 and the stator 7. The magnetic flux continuously changes as a time elapses and the magnetic attracting force acts on the poles 2 as a swinging force so that the poles 2 are swung as shown by the arrow in FIG. 11. The swing motion of the poles 2 generates electromagnetic noise.

Figure 12:
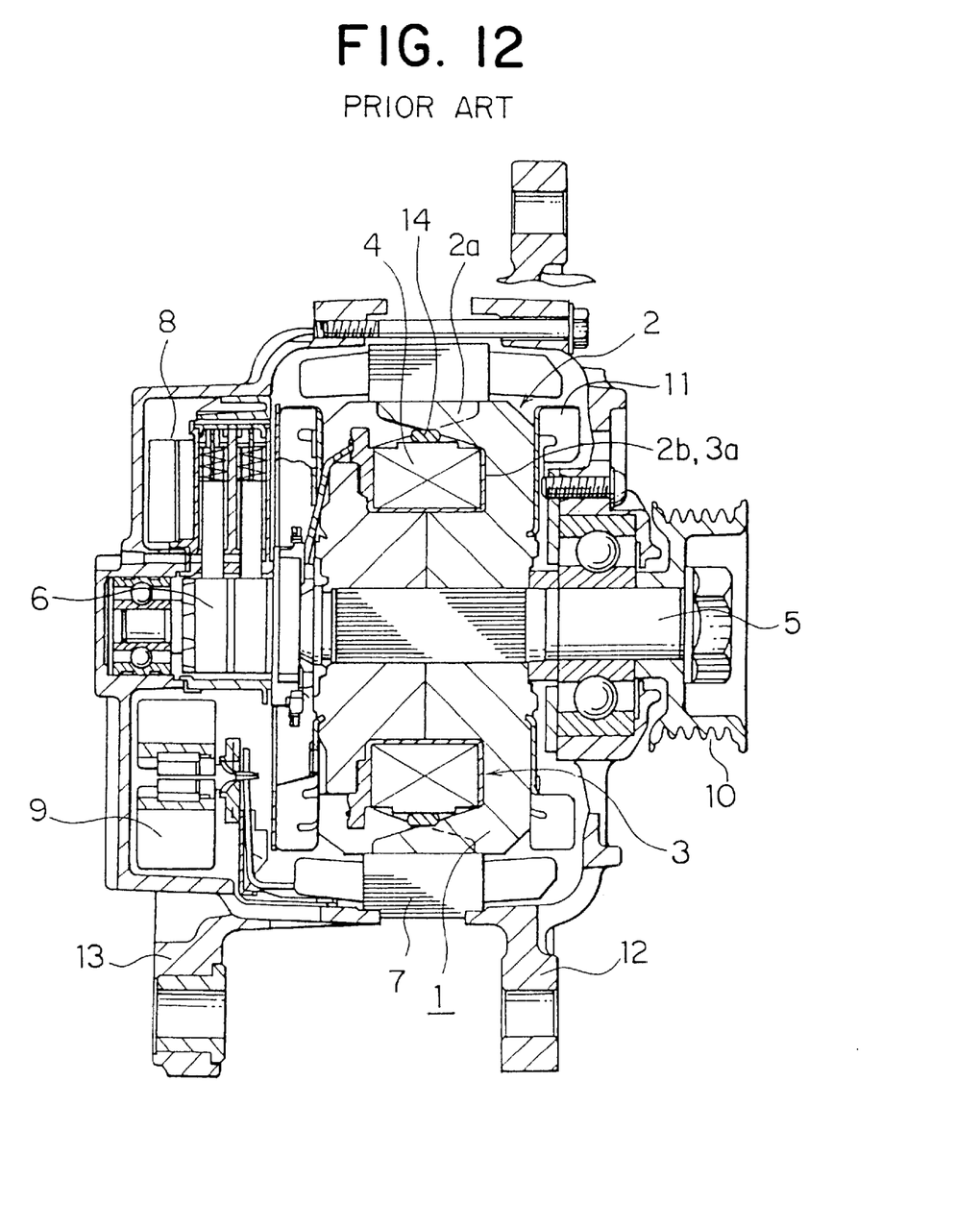
FIG. 12 is a sectional view showing another example of the conventional vehicle alternator.

One conventional approach to reduce the electromagnetic noise, employs a ring 14 abutted against the inside of the claws 2a to increase the rigidity of the poles 2, shifting the vibration to a high frequency region. However, when the frequency of a forced power extends over a wide range of frequency as in the case of vehicles, this countermeasure only shifts the timing at which a noise is generated by the vibration to the high frequency region side and does not become a basic solution for reducing the electromagnetic noise. Further since the number of parts is increased, the cost is similarly increased.

SUMMARY OF THE INVENTION

An object of the present invention is to solve the above problem by providing a vehicle alternator capable of effectively reducing electromagnetic noise.

In order to achieve this object, according to one aspect of the present invention, there is provided a vehicle alternator having a bobbin around which a coil is wound and which is mounted in Lundell-type poles, the vehicle alternator comprising a auxiliary vibrating body mounted to the poles so as to constitute a vibration system having two-degrees of freedom which is composed of the poles and the auxiliary vibrating body, wherein the auxiliary vibrating body has a natural frequency approximately equal to that of the poles.

DESCRIPTION OF THE PREFERRED EMBODIMENTS

Embodiments of the present invention will be described below with reference to the drawings.

Embodiment 1

Figure 1:
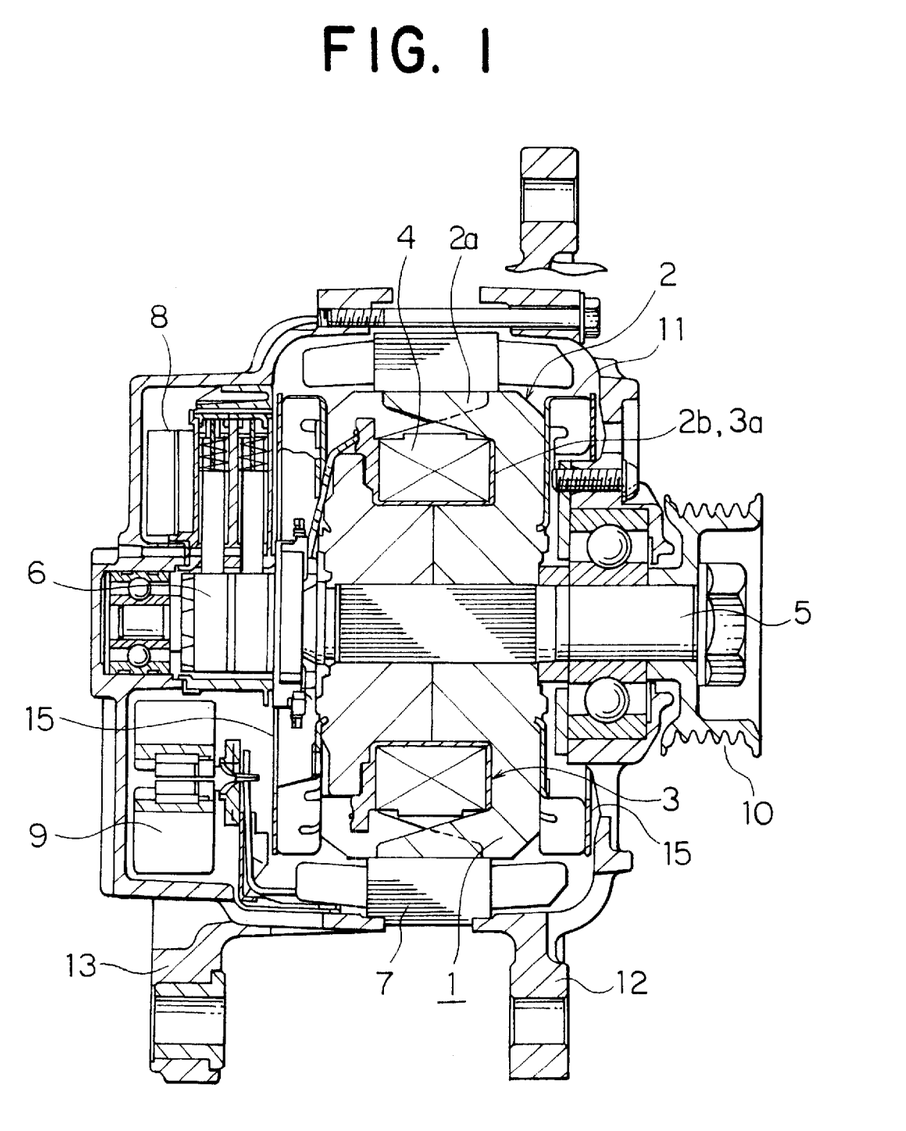
FIG. 1 is a sectional view showing a vehicle alternator according to an embodiment 1 of the present invention.
Figure 2:
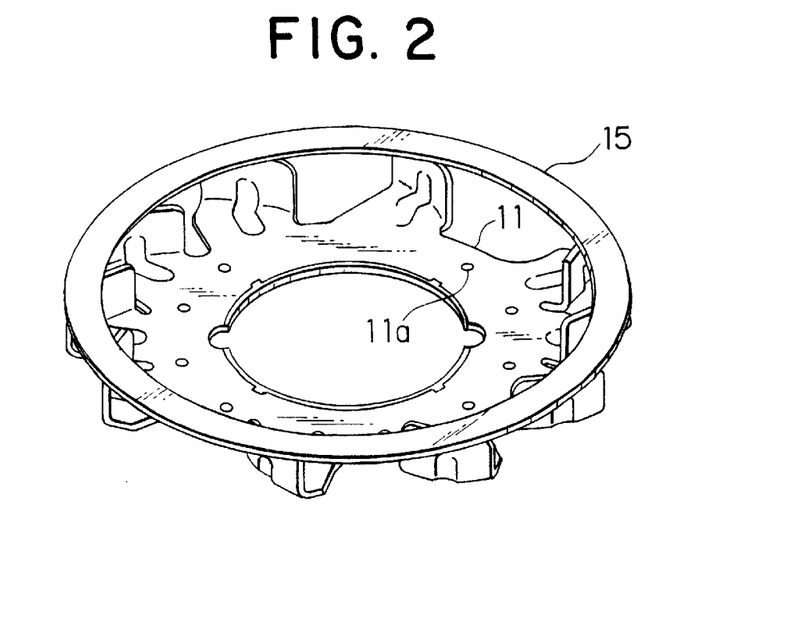
FIG. 2 is a perspective view showing a fan applied to the vehicle alternator according to the embodiment 1 of the present invention.
Figure 3:
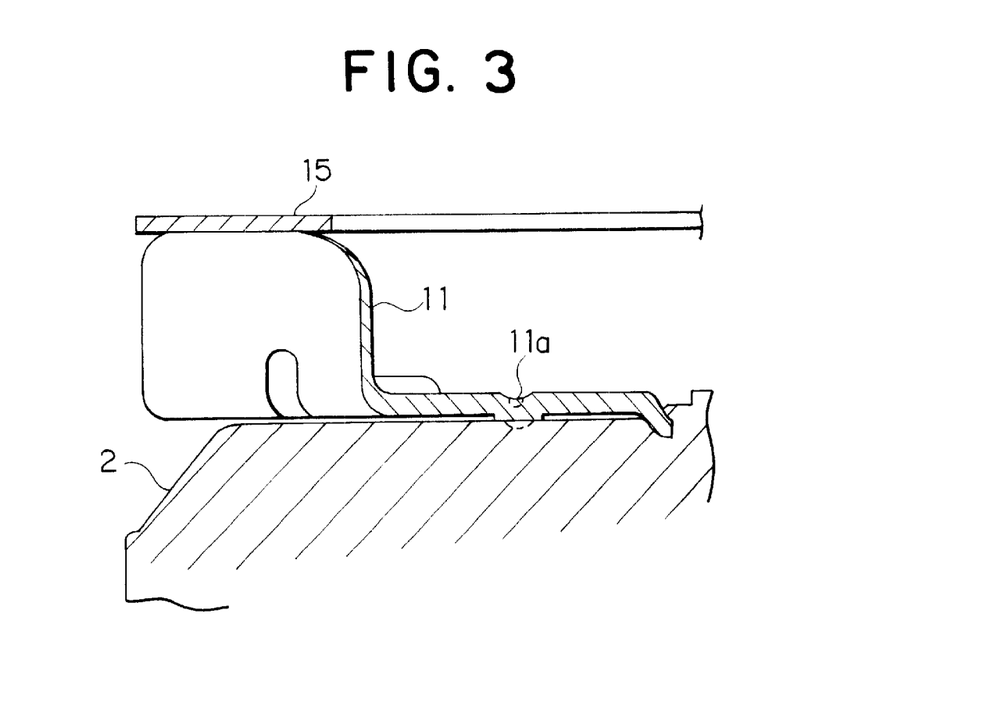
FIG. 3 is a sectional view of the main portion of the fan in the vehicle alternator according to the embodiment 1 of the present invention and shows how the fan is mounted.

FIG. 1 is a sectional view showing a vehicle alternator according to an embodiment 1 of the present invention, FIG. 2 is a perspective view showing a fan applied to the vehicle alternator according to the embodiment 1 of the present invention and FIG. 3 is a sectional view of the main portion of the fan in the vehicle alternator according to the embodiment 1 of the present invention and shows how the fan is mounted.

In FIG. 1, a rotor 1 is composed of a pair of claw-shaped poles 2 each having a plurality of claws 2a formed thereto, a bobbin 3 around which a coil 4 is wound, a rotary shaft 5 and a slip ring 6. The pair of poles 2 are disposed in confrontation with each other so that the claws 2a are meshed with each other and the rotary shaft 5 is fixed by being press fitted into the axial center position of the claws 2a. The inner peripheries 2b of the base portions of the claws 2a are abutted against the outer periphery 3a of the bobbin 3 which is fixed between the pair of poles by the press fitting force of the rotary shaft 5. A stator 7 is disposed to the outer peripheries of the poles 2 with a slight interval defined therebetween. A voltage controller is mounted to a brush holder 8. A pulley 10 is mounted to the rotary shaft 5 integrally therewith and fans 11 are mounted to the end surfaces of the poles 2 integrally therewith. A front bracket 12 and a rear bracket 13 are disposed to surround the rotor 1 while journaling the rotary shaft 5.

In FIG. 2, each of the fans 11 is made of a steel sheet and composed of a disc portion and a fan portion formed to the outer periphery of the disc portion integrally therewith. A plurality of welding portions 11a, which project toward the surface of the fan 11 confronting the poles 2, are disposed to the inner periphery of the fan 11 at plurality of positions. Further, a ring-shaped straightening plate 15 is fixed to the fan 11 by welding.

Each of the fans 11, to which the straightening plate 15 is fixed, is applied to and positioned at the end surfaces of the poles 2 and then fixed to the poles 2 by being caulked at the inner peripheral edges thereof as well as welded to the poles 2 at the welding portions 11a and mounted to the poles 2 integrally therewith as shown in FIG. 3.

In the embodiment 1, the rigidity of the fans 11 is increased and the natural frequency of the fans 11 is made approximately equal to that of the poles 2 by the straightening plates 15 fixed to the fans 11.

In general, when a forced power $P_0$ acts on an vibrating body (mass: m, spring constant: k), the following motion equation is established.

$$m \cdot d^2x/dt^2 + kx = P_0 \cos \omega t$$

Note, a damping term is ignored in the equation for simplification. In addition, ω represents the angular frequency of the forced power and x represents the displacement of the vibrating body.

Figure 4:
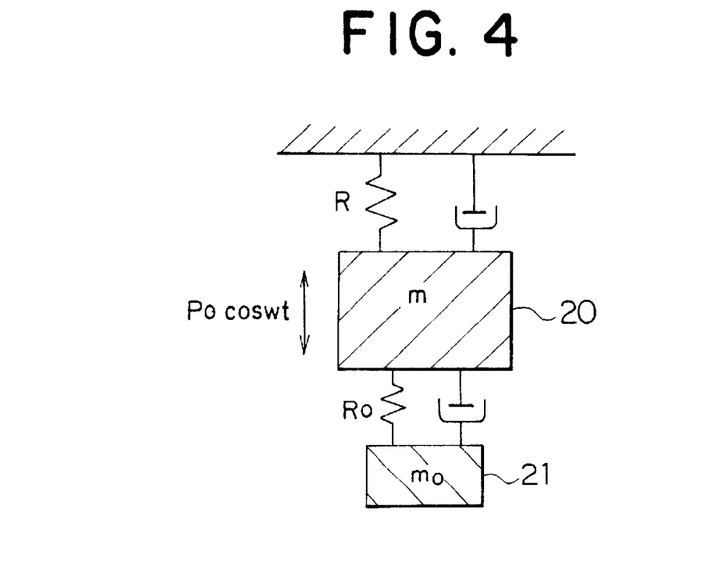
FIG. 4 is a view explaining a vibration system having two-degrees of freedom composed of a main vibrating body and an auxiliary vibrating body.

When the vibration of the vibrating body (main vibrating body) is a problem, it will be effective to constitute a vibration system having two-degrees of freedom by mounting the vibration system of an auxiliary vibrating body 21 to the vibration system of the main vibrating body 20 and cause the natural frequency of the main vibrating body to coincide with that of the auxiliary vibrating body as shown in FIG. 4.

That is, the vibration system of the auxiliary vibrating body 21 acts as a dynamic damper and suppresses the amplitude of the vibration system of the main vibrating body 20 to a low level.

In the embodiment 1, since the fans 11 are fixed to the poles 2, an assembled body which is composed of the poles 2 and the fans 11 constitutes a model of the vibration system having two-degrees of freedom in which the poles 2 act as the main vibrating body 20 and the fans 11 act as the auxiliary vibrating body 21. Then, the rigidity of the fans 11 is increased and the natural frequency of the fans 11 is made approximately equal to that of the poles 2 by the straightening plates 15 fixed to the fans 11.

Figure 5:
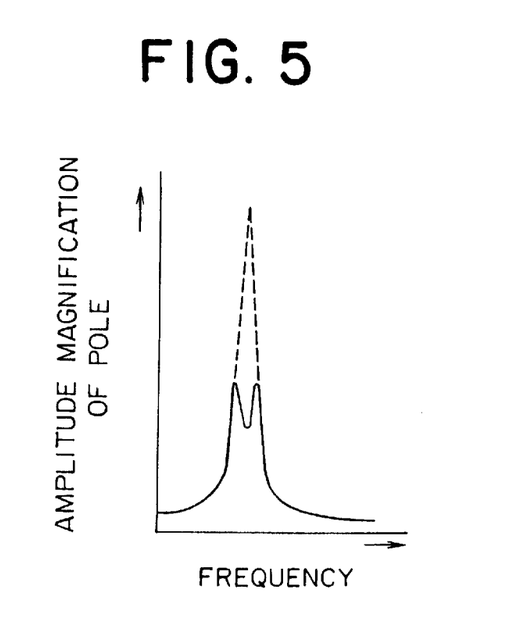
FIG. 5 is a graph showing the result of measurement of the amplitude magnification of poles in the assembly of the poles and fans, the assembly being applied to the vehicle alternator according to the embodiment 1 of the present invention.

FIG. 5 shows the result of measurement of the amplitude magnification of the poles 2 in the assembled body. In FIG. 5, a solid line shows the amplitude magnification of the poles 2 in the assembled body of the embodiment 1 and a dotted line shows the amplitude magnification of only the poles 2. It can be found from FIG. 5 that the fans 11 act as the dynamic damper and suppresses the amplitude of the poles 2 to a low level.

Figure 6:
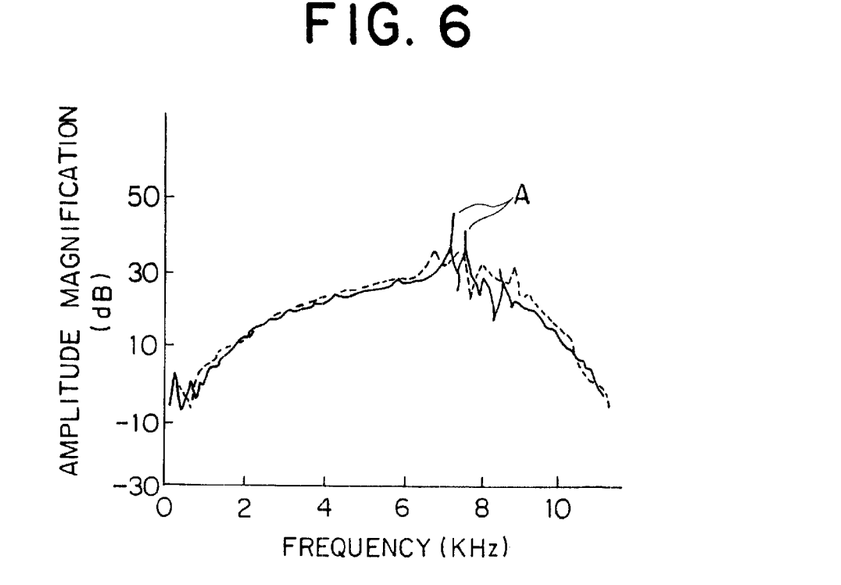
FIG. 6 is a graph showing the result of measurement of the amplitude magnification of the poles in a rotor which is applied to the vehicle alternator according to the embodiment 1 of the present invention.

FIG. 6 shows the result of measurement of the amplitude magnification of the poles 2 measured by an impulse hammer when the rotor 1 is assembled using the assembled body composed of the poles 2 and the fans 11 to which the straightening plates 15 are fixed. In FIG. 6, a dotted line shows the embodiment 1 of the present invention and a solid line shows a comparative example without the straightening plates 15.

It is observed from FIG. 6 that the comparative example without the straightening plate 15 has a steep peak A in the frequency region of 7–8 kHz where an electromagnetic noise is generated when an actual device is mounted, whereas the peak is damped in the frequency region of 7–8 kHz in the embodiment 1 provided with the straightening plates 15.

As described above, according to the embodiment 1, the fans 11, which are welded to the poles 2 and affixed to the straightening plates 15, act as a damper and suppress the amplitude of the poles' 2 vibration to a low level. As a result, the amplitude of the poles' 2 vibration, which is caused by the magnetic attracting force acting on the poles 2, can be reduced, thereby reducing high speed electromagnetic noise.

Note, although the natural frequency of the fans 11 is made approximately equal to that of the poles 2 by fixing the straightening plates 15 to the fans 11, means for making the natural frequency of the fans 11 approximately equal to that of the poles 2 is not limited to the above arrangement. For example, a rib may be formed to each of the fans 11 or the fans 11 may be thickened.

Embodiment 2

Figure 7:
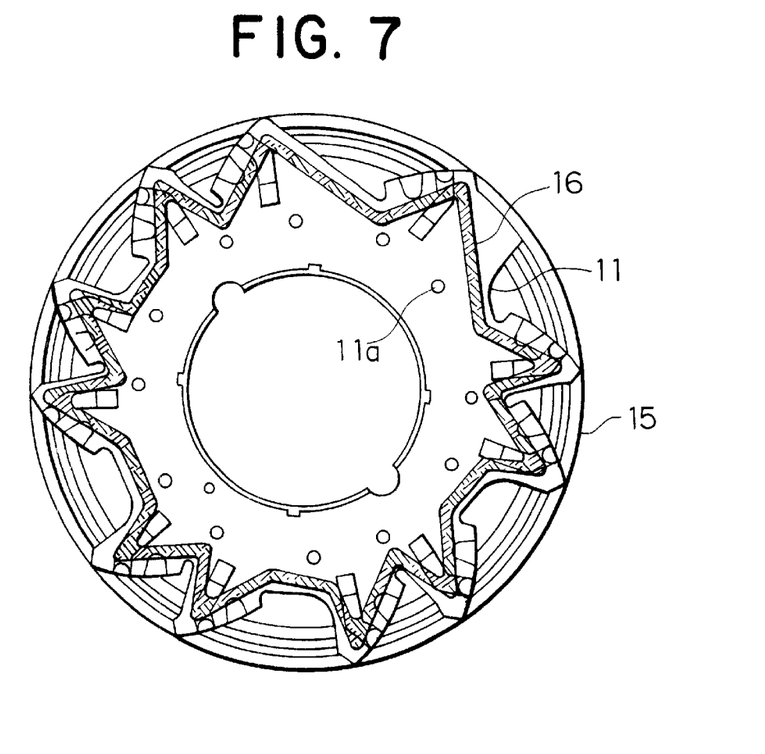
FIG. 7 is a view of a fan applied to the vehicle alternator according to an embodiment 2 of the present invention when viewed from the side of poles.
Figure 8:
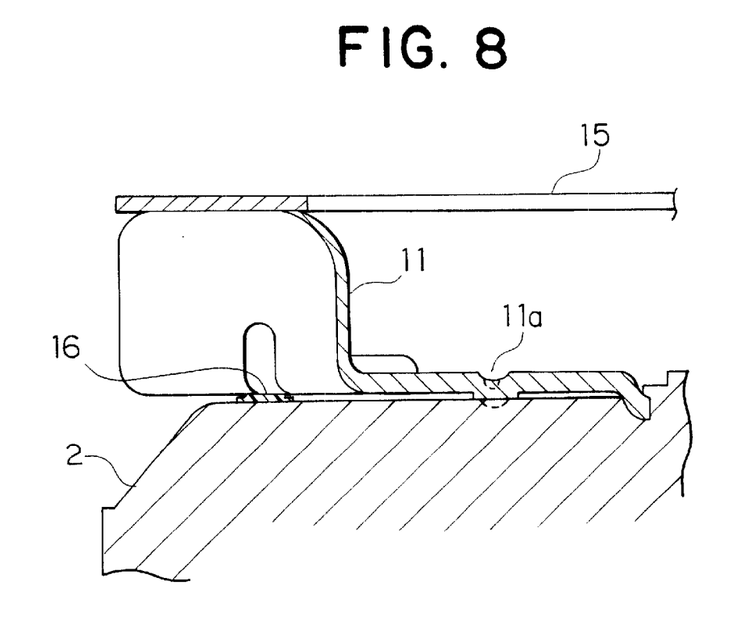
FIG. 8 is a sectional view of the main portion of the fan in the vehicle alternator according to the embodiment 2 of the present invention and shows how the fan is mounted.

FIG. 7 is a view of a fan applied to the vehicle alternator according to an embodiment 2 of the present invention when viewed from the side of poles and FIG. 8 is a sectional view showing the main portion of the vehicle alternator according to the embodiment 2 of the present invention and shows how the fan is mounted.

In FIG. 7, an elastic body 16 is formed to the surface of the fan 11 confronting the poles 2 in the vicinity of the entire outer peripheral edge thereof in a line shape. The elastic body 16 is formed in such a manner that the paste of a silicone rubber resin such as, for example, TSE3212 (made by Toshiba Silicone Co. Ltd.) is applied to the surface of the fan 11 confronting the pole 2 at the entire outer peripheral edge thereof and thereafter heated and cured. The fan 11 to which the elastic body 16 is formed is positioned at the end surfaces of the poles 2 and mounted to the poles 2 by being welded at welding portions 11a while being press fitted as shown in FIG. 8. The elastic body 16, interposed between the poles 2 and the fan 11, is thereby compressed.

In all other respects, embodiment 2 is the same as embodiment 1.

In the embodiment 2, since the fans 11 are natural frequency of the fans 11 are made approximately equal to that of the poles 2 by attaching straightening plates 15, the high speed electromagnetic noise can be effectively reduced as in the embodiment 1.

The vibration of the poles 2 particularly the high amplitude vibration of the outside portions of the poles 2, can be further suppressed by the damper effect of the elasticity of the elastic bodies 16 interposed between the poles 2 and the fans 11.

Since the elastic bodies 16 are interposed between the poles 2 and the fans 11 on the outer peripheral side thereof in the embodiment 2.

Further, since the elastic bodies 16 are interposed between the poles 2 and the fans 11 in the embodiment 2, the straightening plates 15, the fans 11 and the elastic bodies 16 act as a viscous damper in a vibration system having two-degrees of freedom which is composed by integrating the poles 2 with the fans 11 by welding the fans 11 to the poles 2 at the welding portions 11a, by which the amplitude of the poles 2 as a main vibrating body can be uniformly reduced over a wide range of frequency.

Note that although the elastic body 16 is formed by applying the paste of the elastic material such as the silicone rubber resin and heating and curing it, the elastic body 16 may be formed by stamping an elastic sheet material composed of the silicone rubber resin to a desired shape. In this case, since the processes for applying, heating and curing the paste are unnecessary, productivity is improved.

Embodiment 3

Figure 9:
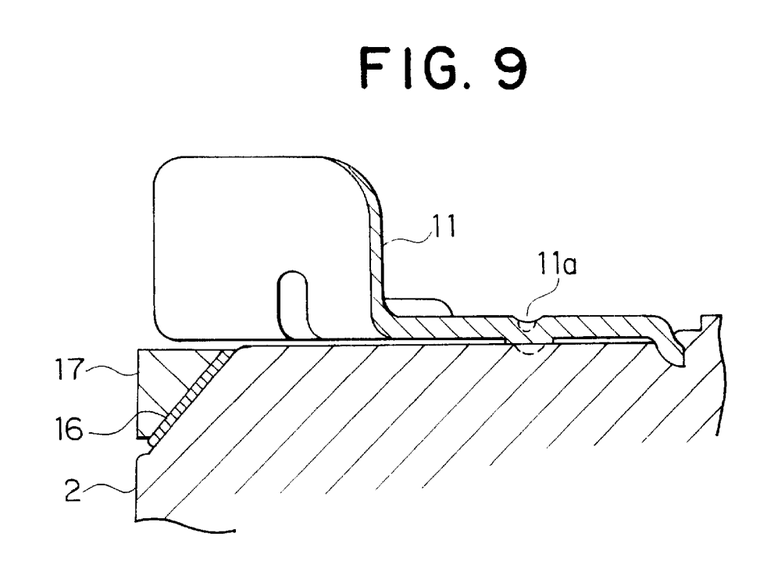
FIG. 9 is a sectional view of the main portion of a vibration-resistant ring in the vehicle alternator according to an embodiment 3 of the present invention and shows how the vibration-resistant ring is mounted.

As shown in FIG. 9, an embodiment 3 is arranged such that a damper ring 17 is mounted to each of the poles 2 by being welded to the outer peripheral edge of the pole 2 on the side of a fan 11 and an elastic body 16 is interposed between the pole 2 and the vibration-proof ring 17. The vibration-proof ring 17 is made such that the inner peripheral surface of the ring body made of a steel material, is cut to the shape which conforms to the inclination of the outer peripheral edge of the pole 2 on the fan 11 side and acts as an auxiliary vibrating body whose natural frequency is made approximately equal to that of the pole 2. In all other respects, embodiment 3 is the same as that of the embodiment 1.

In the embodiment 3, since the vibration-proof rings 17 are mounted to the poles 2 by being welded to the outer peripheral edges of the poles 2 on the fan 11 side to thereby constitute an auxiliary vibration system having two-degrees of freedom as well as the elastic bodies 16 are interposed between the vibration-proof rings 17 and the poles 2, the same advantage as that of the above embodiments can be obtained.

Since the present invention is arranged as described above, the following advantages can be achieved.

According to the present invention, in a vehicle alternator having a bobbin around which a coil is wound and which is mounted in Lundell-type poles, since an auxiliary vibrating body is mounted to the poles so as to constitute a vibration system having two-degrees of freedom which is composed of the poles and the auxiliary vibrating body and the auxiliary vibrating body has a natural frequency approximately equal to that of the poles, there can be obtained a vehicle alternator capable of effectively reducing high speed electromagnetic noise.

Since the elastic bodies are interposed between the poles and the auxiliary vibrating body, the amplitude of the poles can be uniformly reduced over the wide range of frequency.

Further, since the steel sheet fans are mounted to the poles integrally therewith by being fixed to the end surfaces of the poles on the inner peripheral surface sides of the fans and act as the auxiliary vibrating body, the high speed electromagnetic noise can be effectively reduced without making any special parts.

What is claimed is:

1. A vehicle alternator having a bobbin around which a coil is wound and which is mounted within a plurality of interleaved poles, comprising: an auxiliary vibrating body mounted to the poles so as to constitute a vibration system having two-degrees of freedom which is composed of the poles and the auxiliary vibrating body, wherein the auxiliary vibrating body has a natural frequency tuned to approximately equal that of the poles such that vibrations of claws of the poles are at least partially offset by vibrations of the auxiliary vibrating body to attendantly reduce electromagnetic noise generated by the pole claw vibrations.

2. A vehicle alternator according to claim 1, wherein the auxiliary vibrating body comprises a generally circular sheet steel plate fixed to an axial end face of the poles and having upturned cooling fan blades spaced around a periphery thereof, and a straightening ring fixed to axially outer ends of the fan blades.

3. A vehicle alternator according to claim 2, further comprising a vibration dampening elastic member interposed between the end face of the poles and the circular plate.

4. A vehicle alternator according to claim 3, wherein the elastic member is generally ring-shaped and is disposed toward the outer periphery of the rotor.

5. A vehicle alternator having a bobbin around which a coil is wound and which is mounted within a plurality of interleaved poles, comprising: an auxiliary vibrating body mounted to the poles so as to constitute a vibration system having two-degrees of freedom which is composed of the poles and the auxiliary vibrating body, wherein the auxiliary vibrating body has a natural frequency tuned to approximately equal that of the poles such that vibrations of claws of the poles are at least partially offset by vibrations of the auxiliary vibrating body to attendantly reduce electromagnetic noise generated by the pole claw vibrations, wherein the auxiliary vibrating body comprises a damper ring surrounding an outer axial edge of the poles, opposite the claws, with the interposition of a vibration dampening elastic member.

* * * * *